US005960402A

United States Patent [19]
Embutsu et al.

[11] Patent Number: 5,960,402
[45] Date of Patent: Sep. 28, 1999

[54] INFORMATION MANAGEMENT APPARATUS DEALING WITH WASTE AND WASTE RECYCLE PLANNING SUPPORTING APPARATUS

[75] Inventors: Ichiro Embutsu, Goleta, Calif.; Kenji Baba, Hitachi, Japan; Masayoshi Kubota, Hitachiota, Japan; Harumi Matsuzaki, Hitachi, Japan

[73] Assignee: Hitachi, Ltd., Tokyo, Japan

[21] Appl. No.: 08/965,483

[22] Filed: Nov. 6, 1997

Related U.S. Application Data

[62] Division of application No. 08/071,492, Jun. 4, 1993, Pat. No. 5,699,525.

[30] Foreign Application Priority Data

Jun. 9, 1992 [JP] Japan ................................. 4-149207

[51] Int. Cl.⁶ .............................................. G06F 17/60
[52] U.S. Cl. ................................. 705/1; 209/3.3; 283/70
[58] Field of Search .................................. 705/7, 10, 28, 705/128; 209/3.1, 3.3, 583; 283/70

[56] References Cited

U.S. PATENT DOCUMENTS

| | | |
|---|---|---|
| 4,360,875 | 11/1982 | Behnke . |
| 4,427,551 | 1/1984 | Duveau .................................. 210/741 |
| 5,042,634 | 8/1991 | Gulmini ................................. 194/209 |
| 5,051,914 | 9/1991 | Sansone et al. . |
| 5,055,237 | 10/1991 | Husseiny ................................ 252/631 |
| 5,100,005 | 3/1992 | Noble et al. ............................ 209/583 |
| 5,190,165 | 3/1993 | Garfield, Jr. . |
| 5,249,690 | 10/1993 | Patterson .............................. 209/630 |
| 5,272,638 | 12/1993 | Martin et al. . |
| 5,299,693 | 4/1994 | Ubaldi et al. ........................... 209/3.3 |
| 5,447,017 | 9/1995 | Becher et al. ........................... 53/527 |
| 5,718,457 | 2/1998 | Weinstock ................................ 283/70 |

FOREIGN PATENT DOCUMENTS

| | | |
|---|---|---|
| 3636310 | 4/1988 | Germany . |
| 59-85568 | 5/1984 | Japan . |
| 60-12403 | 1/1985 | Japan . |
| 61-80354 | 4/1986 | Japan . |

OTHER PUBLICATIONS

Rumelhart et al., "Learning Representations by Backpropagating Errors", Nature, vol. 323, 1986, pp. 533–536.
Software Description—Landfill Accounts Receivable 2X, Jan. 25, 1992, released.
New Scientist, "Infrared Makes Light Work of Sorting Plastics", Jul. 17, 1993, p. 20.
Plastic News, "Why Waste America Venture to Reprocess Polyethylene".
Gupta et al., "Towards Designing An Information–Flow–Structure of Resource Wastes For National Planning", Systems Research, vol. 5, No. 3, pp. 247–254, 1988.
Clark et al., "Systems Planning For Solid Waste Collection", Computers & Operations Research, vol. 3, No. 3, pp. 157–173, 1976.
Morris et al., Database Inspec. Institute of Electrical Engineers, Inspec. No. 339076, vol. 1, pp. 419–422, (Abstract) 1988.

(List continued on next page.)

Primary Examiner—Edward R. Cosimano
Attorney, Agent, or Firm—Antonelli, Terry, Stout & Kraus, LLP

[57] ABSTRACT

An information management apparatus dealing with waste in a waste recycling system comprises an information management device for managing information on waste of each depository, and a device of determining the waste collection method based on the information and the process volume of a recycling processor. The apparatus determines the waste collection method so that recycling products can be delivered stably.

14 Claims, 5 Drawing Sheets

OTHER PUBLICATIONS

Aware, published by Recra Environmental, Inc. Mar. 8, 1991, pp. 1–38.

Rathi et al., "Allocating Resources to Support a Multicommodity Flow With Time Windows", "The Logistics and Transportation Review", vol. 28, No. 2, pp. 167–188, Jun. 1992.

Tyworth, "Modeling Transportation–Inventory Trade–Offs In A Stochastic Setting", Journal of Business Logistics, vol. 13, No. 2, pp. 97–124, 1992.

Netter et al., "Applied Statistics", Fourth Edition, pp. 599–604, 1993.

Press et al., "Numerical Recipes in C", The Art of Scientific Computing, Second Edition, pp. 661–665, 1988.

INFORMATION MANAGEMENT APPARATUS DEALING WITH WASTE AND WASTE RECYCLE PLANNING SUPPORTING APPARATUS

This is a divisional of prior application Ser. No. 08/071,492, filed Jun. 4, 1993, now U.S. Pat. No. 5,699,525.

BACKGROUND OF THE INVENTION

1. Field of the Invention

This invention relates to an information management apparatus dealing with waste in a recycling system which processes waste for recycling, and particularly to a information management apparatus dealing with waste suitable for use in a recycling system which collects discarded home electric appliances and processes them for recycling. The invention also relates to a waste generation quantity prediction apparatus and a waste recycling plan supporting apparatus.

2. Description of the Related Art

As a result of the prevalence of home electric appliances, discarded home electric appliances are increasing drastically and processing of these objects is becoming a social problem. Discarded home electric appliances of end users (consumers) are collected by the local governing bodies, home electric appliance dealers and waste processing agents, and, after being transported to the recycling facility, these objects are processed for recycling or abandonment. It is expected that the recycling system for reclaiming discarded home electric appliances will become more important in the future.

For a recycling system for reclaiming discarded home electric appliances, it is required to feed waste stably, and accordingly the information management for waste collected from end users becomes important. There are very few reports concerning the information management dealing with waste.

Among publications dealing with the information management of waste, Japanese patent publication JP-A-60-12403 describes a waste collection management system. This system is intended to collect garbage efficiently through the provision of a means of monitoring the quantity of garbage stacked in each of depositories within a collection area.

Japanese patent publications JP-A-61-80354 and JP-A-59-85568, as other publications dealing with information management, describe systems for providing the information of used car transaction. These transaction information systems include a central computer and terminals units installed in dealer shops in on-line connection to the central computer, and are designed to register intended transaction conditions of sellers and buyers of used cars through the terminal units to the central computer so as to provide the transaction information for both parties through the search operation.

In the recycling system, it is important to feed certain kinds of discarded home electric appliances stably to the recycling facility so as to meet the demand of recycling products. However, there is no means of information management for dealing with the matter of what kind of and what amount of discarded home electric appliances should be collected from which waste depository. Therefore, the kind and quantity of discarded home electric appliances to be fed to the recycling facility can at most be adjusted within the range of capacity of the stockyard where collected discarded home electric appliances are stored. There is no means of assessment of the quantity of waste generated in the future, and therefore it is not possible to have a long-term prospect of waste supply to the recycling system.

The foregoing publications concerning the handling of waste merely disclose the information management for carrying out the efficient collection of garbage stacked in multiple depositories in a collection area, and they are not designed to determine the kind and quantity of waste to be collected.

The above-mentioned used car transaction information system is not designed to determine the type and quantity of used cars to be collected.

SUMMARY OF THE INVENTION

An object of this invention is to provide an information management apparatus dealing with waste capable of supplying waste stably to meet the demand of the waste recycling facility.

This invention resides in an information management apparatus dealing with waste in a waste recycling system which collects waste stacked in a plurality of depositories and reclaims the waste through the process with a recycling processor. The apparatus comprises information management means for managing information on the kind and quantity of waste stacked in each of the depositories, and waste collection method determination means for determining the method of collection of waste, which is transported from the depositories to the recycling processor, in accordance with the process volume of the recycling processor and information provided by the information management means.

Through the determination of the waste collection method based on the waste management information, it becomes possible to feed waste continuously and stably to the recycling facility.

Besides the above-mentioned determination manner of the waste collection method, it may be based on the stock volume of the stockyard of the recycling facility and information provided by the information management means. This is because the stock volume of stockyard varies with the progress of processing of the recycling processor.

The inventive information management apparatus dealing with waste is preferably provided with process volume determination means for determining the process volume of recycling processor based on the quantity of recycling products demanded by demanding parties and means of determining the waste collection method in consideration of the determined process volume, and consequently it becomes possible to supply recycling products of certain kinds and certain quantities to the demanding parties constantly and stably.

On determining the process volume of recycling processor based on the demanded quantity of recycling products, it is desirable to determine the kind and quantity of waste to be collected in consideration of the space and stock volume of the stockyard and determine the collection method in consideration of the information provided by the information management means. The determination of the amount of waste collection in consideration of the demanded quantity of recycling products and the space and stock volume of the stockyard can possibly encounter the case in which the quantity of waste stacked in the depositories does not suffice for the determined quantity. In order to prevent the occurrence of such situation, it is desirable to determine the kind and quantity of waste to be collected in consideration of the information provided by the recycling product demanding parties and the information management means.

In determining the waste collection method, it is desirable to determine, in addition, the collection region and collection route in consideration of the map information of the collection area. Addition of the information of traffic volume in the collection area is also effective. Consequently, the efficiency of waste collection from the waste depositories can be enhanced, and the expenditure and time for the waste collection can be reduced.

The inventive information management apparatus is preferably provided with terminal units for entering the kind and quantity of waste at individual depositories and a computer connected with these terminal units through a communication network so as to manage information on the kind and quantity of waste collected at each depository.

The terminal unit installed at each depository preferably includes means of reading identification code labels appended to objects which will be sources of waste. The code reading means is preferably a bar code reader.

This invention also provides an information management apparatus dealing with waste comprising waste stock volume management means for managing the quantity of waste stacked in each of the waste depositories in the past based on information provided by the depositories, collection area information management means for managing information which represents the feature of small areas that are divisions of a waste collection area, and waste generation prediction means for predicting the quantity of generation of waste in the small areas based on information provided by the waste stock volume management means and information provided by the collection area information management means. The information of the feature of small areas preferably includes at least one of the number of residents, the land price and the use of area, i.e., industrial area, commercial area, residential area or farming area.

This invention also provides an information management apparatus dealing with waste comprising waste stock volume management means for managing the quantity of waste stacked in each of the depositories in the past based on information provided by the depositories, collection area information management means for managing information which represents the feature of small areas that are divisions of a waste collection area, waste generation prediction means for predicting the quantity of generation of waste in the small areas based on information provided by the waste stock volume management means and information provided by the collection area information management means, and recycle plan determination means for determining at least one of the recycling process plan of the future, the size of stockyard and the method of transportation of waste to the recycling processor based on the result of prediction of waste generation.

The waste collection method determination means may include computation means based on a multi-layered neural network model. This means enables the establishment of an accurate model even if the algorithm of predicting the quantity of waste supply and the like is not known in advance.

The recycling system equipped with the inventive information management apparatus dealing with waste is capable of feeding waste to the recycling facility stably, and it is desirable to simplify the entry of the waste information at waste depositories through the appendition of bar code labels on the surface of objects which will be sources of waste for the sake of a reinforced support of the recycling system.

Through the management of information of waste depositories and the determination of the kind and quantity of waste, which is transported from the depositories to the recycling facility, and the places and route of collection in consideration of the process volume of the recycling processor, it becomes possible to collect waste efficiently. Consequently, recycling products can be supplied constantly and stably to the demanding parties.

DESCRIPTION OF THE PREFERRED EMBODIMENTS

This invention can be applied to recycling systems for collecting and reclaiming waste which is stacked distributively in a collection area, such as a recycling system for discarded home electric appliances including washing machines, refrigerators and television sets, and to a recycling system for discarded vehicles including automobiles and motorcycles.

An embodiment of this invention will be explained with reference to the drawings.

Figure 1:
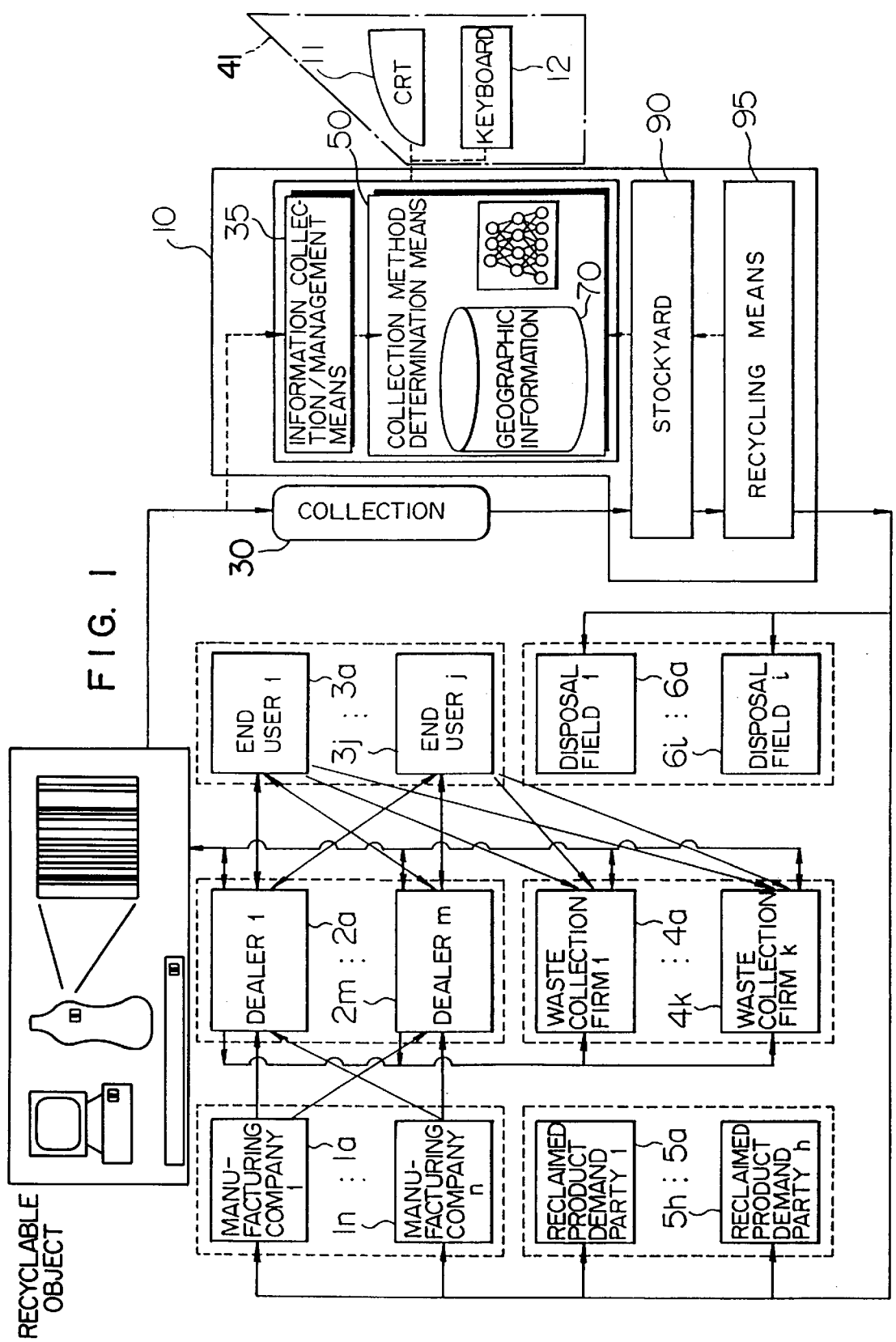
FIG. 1 is a block diagram showing the overall arrangement of the recycling system of discarded home electric appliances to which the information management apparatus dealing with waste based on this invention is applied.

FIG. 1 is a block diagram showing the overall arrangement of the information management apparatus dealing with waste based on an embodiment of this invention which is applied to a recycling system for discarded home electric appliances.

Initially, the retail route and collection route of home electric appliances will be explained in brief. In FIG. 1, home electric appliances manufactured by multiple manufacturing company 1a through 1n are sold to multiple dealer 2a through 2m by way of several wholesalers (not shown), and ultimately the appliances are retailed to multiple end users 3a through 3j. Together with the flow of actual home electric appliances, information on the amount of transaction among the manufacturers, retailers and end users is flowing on the same commercial routes. Discarded home electric appliances held by end users are taken by retailers in exchange for the purchase of new appliances at the time of purchase in many cases. Otherwise, discarded home electric appliances are taken by waste collection firm 4a through 4k. Discarded home electric appliances collected by the retailers and waste collecting agents are brought to a recycling system 10, by which they are processed for recycling. Recycling products coming out of the recycling system 10 are supplied to the manufacturers and reclaimed product demand parties 5a through 5h. Low-value recycling products having no accepting parties are discarded to disposal fields or the like 6a through 6i.

Next, the recycling system 10 will be explained. The recycling system 10 consists of the following constituents.
(1) collection means 30,
(2) information collection/management means 35,
(3) collection method determination means 50,
(4) stockyard 90,
(5) recycling means 95

The information collection/management means 35 collects and manages commercial information of home electric appliances, and sends the information to the collection method determination means 50. The collection method determination means 50 determines an efficient collection method based on this information, and activates the collection means 30 accordingly. The collection means 30 collects discarded home electric appliances under control of the determination means 50, and transports the collected objects to the stockyard 90 of the recycling facility. Discarded home electric appliances stacked in the stockyard 90 are combined in terms of the kind, type and quantity of objects so that the recycling product has a uniform quality, and fed to the recycling means 95 in the recycling facility and rendered the recycling process. Among products, valuable recycling products are placed back on the commercial routes.

The foregoing is the outline of the overall arrangement and operation of this embodiment.

Next, the individual constituents will be explained in detail in order.

The collection means 30 is a means of transporting discarded home electric appliances collected by the retailers and waste collecting agents to the stockyard 90 of the recycling system 10. Specifically, it includes a number of trucks having a capacity of several tons. The number of trucks needed is dependent on the quantity of discarded home electric appliances to be collected, and for example three 2-ton trucks are required to collect 100 sets of two-chamber washing machines. The collection means 30 operates to collect discarded home electric appliances in the collection area in accordance with the method determined by the collection method determination means 50 which will be explained later.

In case the retailers and waste collecting agents provide transportation means (such as trucks) for transporting discarded home electric appliances to the stockyard 90, they may take the place of the collection means 30. In this case, the output of the collection method determination means 50 is displayed on the display screen of information terminal units 41 possessed by the retailers and waste collecting agents.

Figure 2:
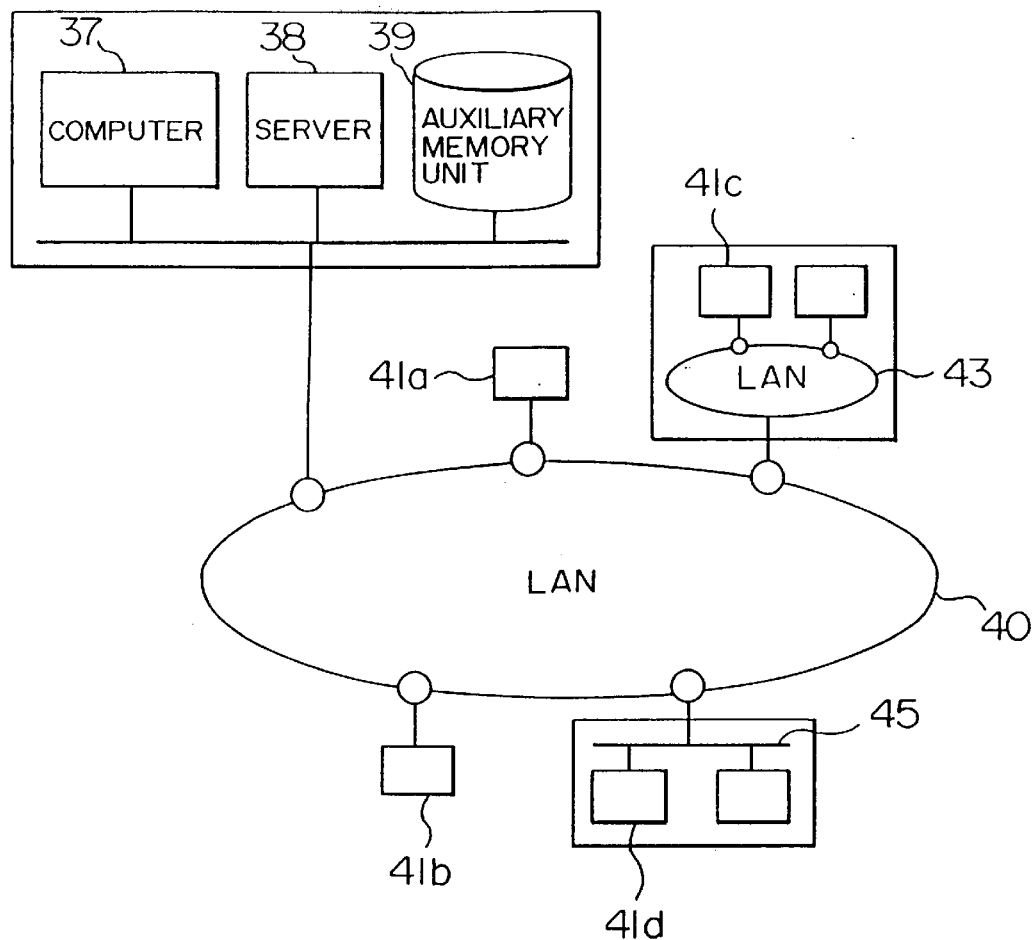
FIG. 2 is a diagram showing the hardware structure of the information collection/management means.

The information collection/management means 35 is a means of collecting and managing information flowing together with home electric appliances in the collection area. The content of information is specifically the kind, type and quantity of home electric appliances, the time of sale or collection, and the location of sale or collection. FIG. 2 shows an example of the hardware structure of the information collection/management means 35. The sale or collection data is entered on information terminal units 41a, 41b, 41c, 41d and so on connected to the system through a LAN (local area network) 40. The information terminal units 41 of the retailers and waste collecting agents are not required to be an exclusive communication equipment for the recycling system, but they may be used also for the inventorial job. The LAN 40 is not required to be an exclusive communication line for the recycling system, but it may be an existing line used mainly for the communication among the chain stores of retailers for example. Some information terminal units 41 may be connected to separate LAN 43 and LAN 45 in connection with the LAN 40 in some cases. Installed in the recycling system 10 are a network server 38 for managing the LAN 40 and a computer 37 for managing data. In the case of managing a vast amount of data, it is desirable to include an auxiliary memory unit 39.

Figure 3:
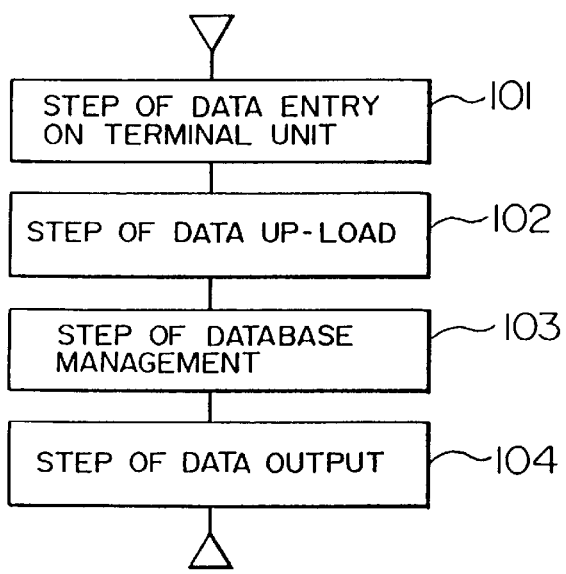
FIG. 3 is a flowchart showing the operation of the information collection/management means.

FIG. 3 shows in flowchart the operation of the information collection/management means 35. In the first step 101 of data input, various kinds of data mentioned previously are entered through the information terminal unit 41 installed at each retailer or waste collecting agent. Input data is stored in the memory in the terminal unit. In the subsequent step 102 of data up-loading, stored data are transmitted to the data management computer 37 at a constant interval. In the database management step 103, transmitted data is stored in the computer 37 or a database formed in the auxiliary memory unit 39. Preferably, data is stored in correspondence to location information (map information which will be explained later) of each data originating retailer or waste collecting agent. In the final step 104 of data output, data or the result of computation across data items is returned to the collection method determination means 50 in response to the request.

Since data input on the terminal units in the data input step 101 becomes very busy in dealing with a vast amount of data, it is desirable to append identification code labels which can be read optically on home electric appliances from the beginning so as to save the labor of reading. For this purpose, the information terminal unit 41 is preferably equipped with a code reader for reading the code label appended on each home electric appliance. The identification code used here may be of the bar code notation used widely in the POS (point of sales) system. Using the code label enables the accurate and prompt entry of information including the kind, type, manufacturing data, and manufacturer of each discarded home electric appliance necessary for the collecting operation. The code labels are preferably affixed to home electric appliances at the time of manufacturing, and these appliances with code labels are distinguished as recycling-promoting appliances from those without code labels.

Next, the collection method determination means 50 based on this invention will be explained in detail. This means is formed in the same computer in which the information collection/management means 35 is formed. This means implements the following two major processes. One process is to determine the method of daily collection, and another process is to support the determination of a long-term collection plan. These processes will be explained in order.

Figure 4:
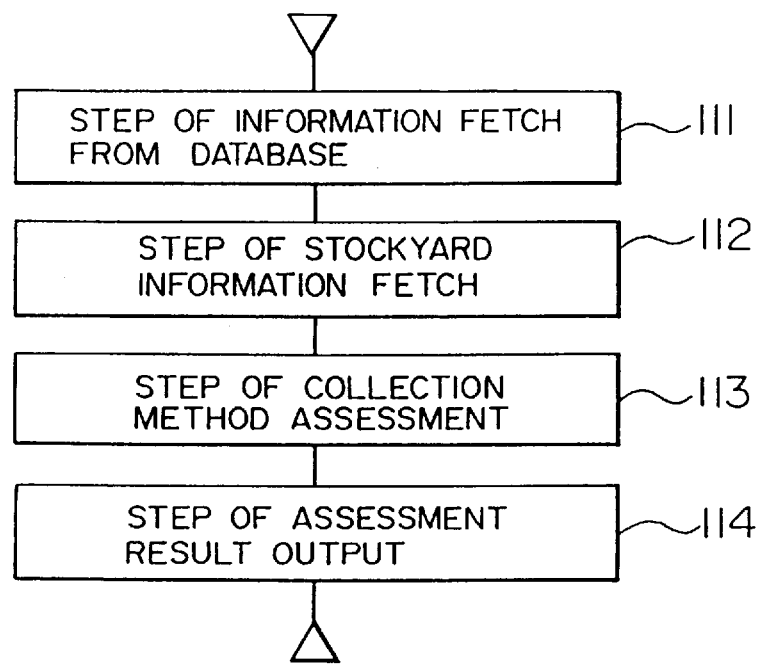
FIG. 4 is a flowchart showing the operation of the waste collection method determination means.

FIG. 4 shows in flowchart the collection method determination process. In the database information entry step 111, data necessary for the determination of collection method is fetched from the database. Items of data to be entered are determined in advance, or alternatively an arbitrary data item may be specified in an interactive manner on a keyboard 12. Specifically, data items include the quantities of home electric appliances sold and collected by each retailer, the quantity of discarded home electric appliances collected by each waste collecting agent, the kind and type of these appliances, and the time length of storage after collection. Data of the demand volume and market price of recycling products (glass, steel, aluminum, plastics, etc.) are also entered in this step. In the subsequent step 112 of entering stockyard information, data of the kind and quantity of discarded home electric appliances which are already stacked in the stockyard 90 and data of the vacant area of the stockyard 90 are entered.

Figure 5:
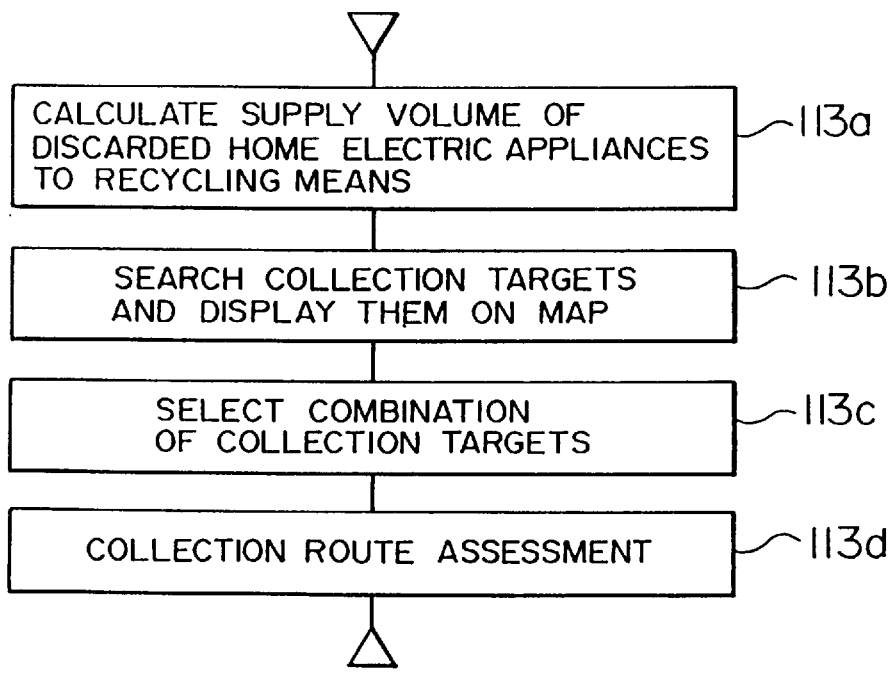
FIG. 5 is a flowchart showing the collection method assessment process implemented by the collection method determination means.

In the subsequent step 113 of collection method assessment, the most efficient collection method at that time point is determined based on the data entered in the previous step. The collection method concerned here is the matter of what amount of discarded home electric appliances among those distributed in multiple places within the collection area should be collected from individual places in what order and through which route. FIG. 5 shows in flowchart the details of this process. In the first step 113a, the quantity of discarded home electric appliances to be fed to the recycling means 95 is calculated based on the waste supply condition including the demand volume of recycling products. A model as shown by expression 1 is used for this calculation.

$$A=f(B), \text{ or } A=f\cdot B \ldots \text{(expression 1)}$$

where A is the supply volume of discarded home electric appliances, and B is the demand volume of recycling product, and f is the supply volume determination model.

The argument A represents the supply volume of a home electric appliance j of type i (e.g., the number of two-chamber washing machines supplied), or the supply volume of different appliances in combination (e.g., the number of single-chamber washing machines, two-chamber washing machines, two-door refrigerators, etc. supplied). The argument B represents the demand volume of recycling product k (e.g., the quantity of funnel glass in demand), or the quantity of different products in combination (e.g., the quantity of funnel glass, panel glass, etc. in demand). The model f can be created from the knowledge of the component parts of each home electric appliance and the materials of the parts. The model is expressed in the form of a multi-regressive model, neural network model, matrix, or the like. The neural network model is of multi-layer type (also called Rumelhart model), with argument B data and argument A data being placed on the input layer and output layer, respectively. The neural network model is created by the learning calculation based on the conventional error back propagation method (for details, refer to article entitled "Learning representations by back propagating errors" in Nature, volume. 323, pages. 533–536, written by Rumelhart, D. E., etc. in 1986).

Alternatively, the demand volume of the recycling facility is assumed to be the supply volume of discarded home electric appliances in some cases, instead of using the above-mentioned calculation for the prediction of supply volume. The demand volume of recycling product can also be evaluated as a function of the market price of the product in place of the demand volume of demanding parties.

Figure 6:
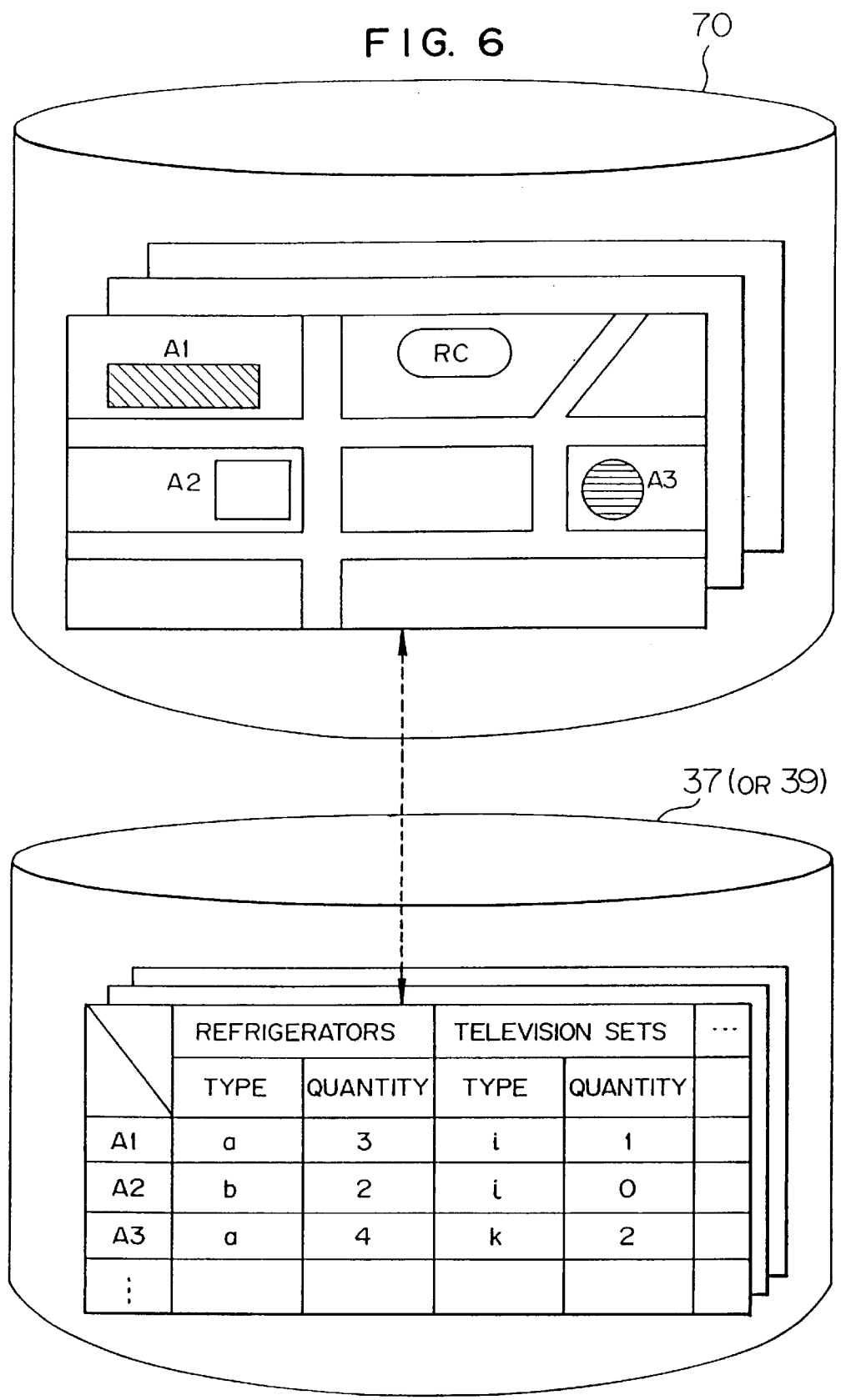
FIG. 6 is a diagram explaining the relation between the map information and the database.

In the next step 113b, the computer 37 or the database of the auxiliary memory unit 39 is searched for all collection targets (the locations of collection and the number of home electric appliances) for each home electric appliance with a supply volume of one or more to the recycling means 95 as a result of the preceding calculation. This embodiment is designed to implement this search operation in connection with the map information 70. FIG. 6 depicts in a sense of model the map information 70. The map includes information on the roads in the collection area and the locations of collection (locations of retailers and waste collecting agents). The computer 37 or the database of the auxiliary memory unit 39 is organized to match the locations of collection on the map which is displayed on the display unit 11. The extracted collection targets are highlighted in different colors on the displayed map so that the distribution of home electric appliances to be collected is visible easily.

In the next step 113c, the combination of collection targets which meets the conditions on the ability of the collection means 30 and the available area of the stockyard 90 is determined. If more than one combination meets the conditions, one with the longest time of storage at the the collection place is selected.

In the next step 113d, the collection route of the collection targets which have been determined in the preceding step is determined. Generally, there are multiple routes for the collection means 30 to take in collecting discarded home electric appliances at multiple collection targets and transporting them to the stockyard 90. In order to determine the most efficient, i.e., lowest cost, route from among these possible routes, the collection cost is calculated by means of a model expressed by the following expression 2.

$$\text{collection cost}=g \text{ (length of route, degree of traffic congestion)} \ldots \text{(expression 2)}$$

where g is the cost calculation model.

This model is a function of the length of collection route and the degree of traffic congestion of the route, and it indirectly reflects the fuel and transportation time expended by the collection means 30. The collection route length is evaluated from the map information 70 based on the technique known in the art. The degree of traffic congestion of the route is defined to be a relative value, which is large when the traffic congestion arises and it is small when the traffic is smooth, and it is calculated from the information on the se of area around the route (i.e., residential area, commercial area, etc.) included in the map information 70. It is more desirable to measure the degree of traffic congestion on a real-time basis by means of vehicle recognition devices installed in the collection area. These are the details of the collection method assessment step 113.

In the final step 114 of assessment result output, the collection method which has been determined to be most efficient in the preceding step 113 is displayed on the display unit 11. These are the details of the collection method determinating process. Next, the collection plan determination supporting process which is another process implemented by the collection method determination means 50 will be explained.

Figure 7:
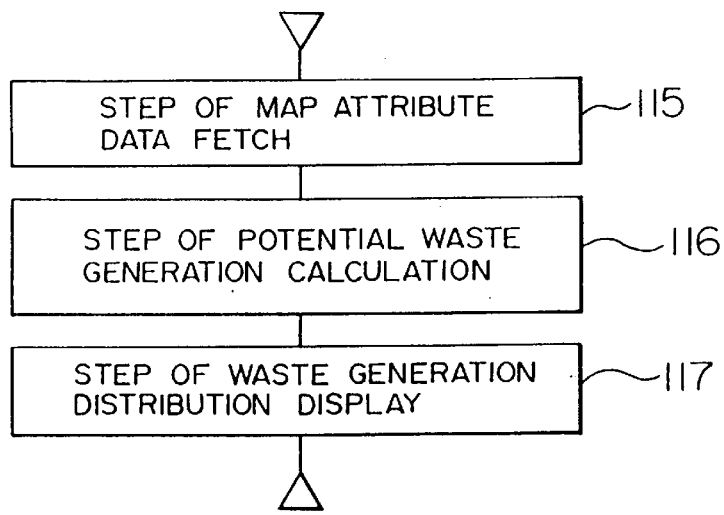
FIG. 7 is a flowchart showing the waste collection plan determination supporting process.

FIG. 7 shows in flowchart the collection plan determination supporting process. This process predicts the quantity of generation of discarded home electric appliances in the collection area to provide information for determining a long-term collection plan. Specifically, it predicts the quantity of generation of discarded home electric appliances in the collection area in the future for planning the disposition of collection means 30 and the reinforcement of ability, or for setting prioritized collection regions. In the first step 115 of entering map attribute data, data of quantity of home electric appliances sold by the retailers, land price, number of desidents, and membership of desidents in the collection area is entered. In the next step 116 of calculating the quantity of potential waste generation, the distribution of potential waste generation in regions of the collection area is calculated by using the entered data based on the model of the following expression 3.

$$w(x, y)=h(a, b, c, x, y) \ldots \text{(expression 3)}$$

where $w(x, y)$ is the quantity of potential waste generation in region x at the time after y years from now, a is the quantity of home electric appliances sold in the x region, b is the average membership of residents in the x region, c is the quantity of waste generation of the x region in the past, and h is the potential waste generation calculation model.

The model h of the expression 3 can be expressed in the form of a multi-regressive model, neural network or the like as in the case of the expression 1. In the final step 117 of displaying the waste generation distribution, the potential waste generation is displayed in different colors depending on the level of generation in each region of collection area on the map of the map information 70 on the display unit 11. Consequently, the distribution of the generation of discarded home electric appliances at the time point after arbitrary number of years from now can be presented in an easily visible manner as useful information for the determination of the collection plan. These are the procedure of the collection plan determination supporting process.

Figure 8:
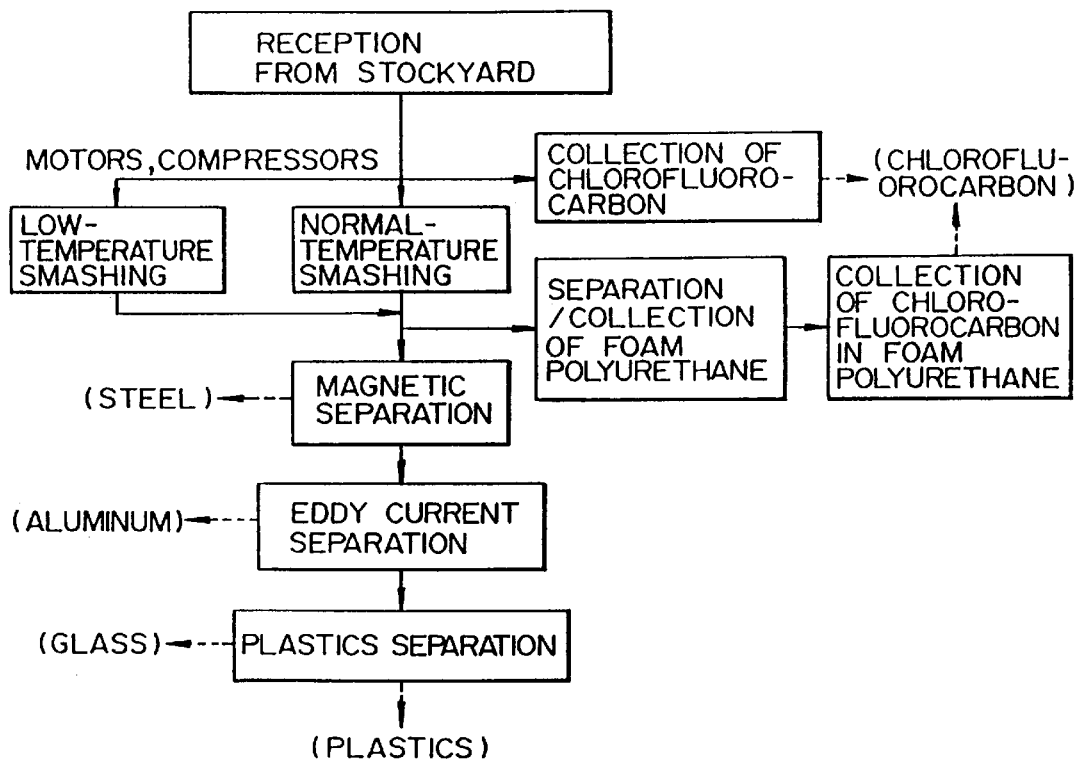
FIG. 8 is a flowchart showing the operation of the recycling means.

Finally, the recycling means 95 will be explained. This means consists of a number of machines installed in the recycling facility. The recycling means 95 is based on the conventional technology, and its operation is shown as an example in the flowchart of FIG. 8. Initially, discarded home electric appliances stored in the stockyard 90 are brought in and they are partially disintegrated. Such component parts as motors and compressors separated in this step are sent to a low-temperature smashing machine and other disintegrated parts are sent to a normal-temperature smashing machine, and all parts are smashed by these machines. The coolant, i.e., chlorofluorocarbon (CFC), contained in compressors is collected prior to this process. Foam polyurethane discharged from the normal-temperature smashing machine is collected and treated in the CFC collection process. Smashed materials discharged by the low and normal-temperature smashing machines are fed through a magnetic selection machine and eddy current selection machine, and steel and aluminum are collected. The residual of these processes is fed through a plastics separator, and it is separated into plastics and glass. Plastics are separated into polyethylene, polypropylene, polystyrene, etc., and then collected.

Among the recycling products delivered by the recycling means 95, less valuable materials are discarded in the disposal fields, and other materials are supplied back to the manufactures and recycling product demanding parties.

Through the collection of discarded home electric appliances under control of the foregoing collection method determination means 50, it is possible to continuously acquire discarded home electric appliances of the kind and quantity in need. Consequently, it is possible to supply discarded home electric appliances to the recycling means 95 continuously, and recycling products can be acquired stably.

Although this embodiment deals with discarded home electric appliances, the same result can be achieved for other kinds of waste.

According to this invention, it becomes possible for a recycling system, which reclaims waste, to feed waste stably to the recycling facility so that intended quantities of intended recycling products can be acquired.

What is claimed is:

1. An object, which will become waste and is suitable for recycling, comprising:

a recycling bar code label provided on a surface of said object, said recycling bar code label for use in recycling of said object.

2. An object as claimed in claim 1, wherein said recycling bar code label pertains to support for a recycling system.

3. An object as claimed in claim 1, wherein said recycling bar code label is a recycling-promoting bar code label.

4. An object as claimed in claim 1, wherein said recycling bar code label is more specifically an optically-readable label.

5. An object as claimed in claim 1, wherein said recycling bar code label includes information pertaining to at least one of a kind, type, manufacturing data and manufacturer of said object.

6. An object as claimed in claim 1, wherein said recycling bar code label is provided on the surface of said object at a time of a manufacturing of said object.

7. A recycling-promoting object comprising: a recycling optically readable bar code label provided on a surface of said object, said label including information for recycling of said object.

8. A recycling-promoting object as claimed in claim 7, wherein said label includes information on at least one of a material and component of the object.

9. A recycling-promoting object as claimed in claim 7, wherein said recycling optically readable bar code label is provided on the surface of said object at a time of manufacturing of said object.

10. A recycling-promoting object as claimed in claim 9, wherein said recycling optically readable bar code label is provided on the surface of said object by an original manufacturer of said object.

11. A recycling-promoting object management method including the steps of:

attaching a recycling bar-code label on a surface of an object when the object is produced, said bar-code label including information necessary for recycling;

storing information pertaining to said recycling bar-code label; and reading said recycling bar-code label on the object when the object is considered as potentially recyclable waste;

processing the object based upon the read said recycling bar-code label and the stored information.

12. A recycling-promoting object management method as claimed in claim 11, wherein a waste collecting route is determined in the processing step.

13. A recycling-promoting object management method as claimed in claim 11, wherein the information necessary to recycling includes at least one of a kind, type, manufacturing data and manufacturer of the object.

14. An object as claimed in claim 6, wherein said recycling bar code label is provided on the surface of said object by an original manufacturer of said object.

* * * * *